United States Patent
Maebashi et al.

(10) Patent No.: US 9,623,816 B2
(45) Date of Patent: Apr. 18, 2017

(54) LOCKING STRUCTURE, ELECTRONIC COMPONENT UNIT AND WIRE HARNESS

(71) Applicant: YAZAKI CORPORATION, Tokyo (JP)

(72) Inventors: Akemi Maebashi, Shizuoka (JP); Pharima Akanitsuk, Shizuoka (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/040,144

(22) Filed: Feb. 10, 2016

(65) Prior Publication Data
US 2016/0242303 A1 Aug. 18, 2016

(30) Foreign Application Priority Data
Feb. 12, 2015 (JP) .................................. 2015-025673

(51) Int. Cl.
| | | |
|---|---|---|
| H05K 5/02 | (2006.01) | |
| H05K 5/00 | (2006.01) | |
| B60R 16/023 | (2006.01) | |
| H02G 5/08 | (2006.01) | |

(52) U.S. Cl.
CPC ................. B60R 16/0238 (2013.01)

(58) Field of Classification Search
CPC ...... H05K 5/02; H05K 5/0247; H05K 5/0221; H02G 5/08
See application file for complete search history.

(56) References Cited

U.S. PATENT DOCUMENTS

| | | | | |
|---|---|---|---|---|
| 6,614,203 B2 * | 9/2003 | Yuasa | ................ | B60R 16/0238 320/104 |
| 7,321,096 B1 * | 1/2008 | Huang | .................. | G03B 17/02 174/135 |
| 7,544,887 B2 * | 6/2009 | Iizuka | ................... | H02G 3/081 174/135 |
| 2002/0180272 A1 * | 12/2002 | Yuasa | ................ | B60R 16/0238 307/10.1 |
| 2004/0109260 A1 * | 6/2004 | Kim | ................... | G11B 15/6656 360/96.51 |
| 2013/0250489 A1 | 9/2013 | Toda et al. | | |

FOREIGN PATENT DOCUMENTS

JP 2013-198347 A 9/2013

* cited by examiner

*Primary Examiner* — Timothy Thompson
*Assistant Examiner* — Michael F McAllister
(74) *Attorney, Agent, or Firm* — Sughrue Mion, PLLC

(57) ABSTRACT

A locking structure includes a locking recess that is formed in a recessed shape on one of a housing which houses an electronic component and a holding member to which the housing is assembled; and a locking protrusion that is formed in a protrusion shape capable of being fitted to the locking recess on the other of the housing or the holding member and capable of being locked to the locking recess. The locking recess has a recess side corner that is formed in a curved shape at an end of the recess side locking surface that is a locking surface with the locking protrusion, and the locking protrusion has a protrusion side corner formed in a curved shape and facing the recess side corner at an end of the protrusion side locking surface that is a locking surface with the locking recess.

9 Claims, 8 Drawing Sheets

SHORT-SIDE DIRECTION

LOCKING STRUCTURE, ELECTRONIC COMPONENT UNIT AND WIRE HARNESS

CROSS-REFERENCE TO RELATED APPLICATION(S)

The present application claims priority to and incorporates by reference the entire contents of Japanese Patent Application No. 2015-025673 filed in Japan on Feb. 12, 2015.

BACKGROUND OF THE INVENTION

1. Field of the Invention

The present invention relates to a locking structure, an electronic component unit and a wire harness.

2. Description of the Related Art

As an electronic component unit provided on a conventional wire harness mounted on a vehicle or the like, for example, Japanese Patent Application Laid-open No. 2013-198347 discloses an electronic component module that has an electronic component substrate in which a plurality of bus bars is attached to an insulating plate and a plurality of electronic components is electrically connected to the plurality of bus bars, and a case that houses the electronic component substrate, and in which external terminal connections provided on each bus bar are collected to form a connector connecting portion. Since the electronic component module is configured so that the connector connecting portion is disposed between the plurality of electronic components, the size reduction of the unit is attained.

Incidentally, although the electronic component module described in Japanese Patent Application Laid-open No. 2013-198347 described above, for example, is configured to be assembled to a holding member such as an electric connection box via a locking structure such as a locking unit provided on the case (housing), there is room for further improvement from the viewpoint of improvement in durability.

SUMMARY OF THE INVENTION

The present invention has been made in view of the above circumstances, and an object thereof is to provide a locking structure, an electronic component unit and a wire harness capable of improving the durability.

In order to achieve the above mentioned object, a locking structure according to one aspect of the present invention includes a locking recess that is formed in a recessed shape on one of a housing which houses an electronic component and a holding member to which the housing is assembled; and a locking protrusion that is formed in a protrusion shape capable of being fitted to the locking recess on the other of the housing or the holding member, and capable of being locked to the locking recess, wherein the locking recess has a recess side corner that is formed in a curved shape at an end of the recess side locking surface that is a locking surface with the locking protrusion, and the locking protrusion has a protrusion side corner that is formed in a curved shape and faces the recess side corner at an end of the protrusion side locking surface that is a locking surface with the locking recess.

According to another aspect of the present invention, it is possible to configure that a curvature of the protrusion side corner is equal to or less than a curvature of the recess side corner.

According to still another aspect of the present invention, it is possible to configure that the recess side corners are formed at both ends of the recess side locking surface, and the protrusion side corners are formed at both ends of the protrusion side locking surface.

According to still another aspect of the present invention, it is possible to configure that the recess side locking surface and the protrusion side locking surface are inclined with respect to a horizontal direction in a state in which the housing is assembled to the holding member.

According to still another aspect of the present invention, it is possible to configure that the locking recess is divided by a locking shaft in which the recess side locking surface is formed, and a pair of arm portions which supports both ends of the locking shaft, and the recess side corner is formed in a connecting portion between the locking shaft and the arm portion.

In order to achieve the above mentioned object, an electronic component unit according to still another aspect of the present invention includes an electronic component; and a housing that houses the electronic component and is assembled to a holding member via a locking structure, wherein the locking structure has a locking recess that is formed in a recessed shape on one of the housing and the holding member, and a locking protrusion that is formed in a protrusion shape capable of being fitted to the locking recess on the other of the housing or the holding member and capable of being locked to the locking recess, the locking recess has a recess side corner that is formed in a curved shape at an end of a locking surface with the locking protrusion, and the locking protrusion has a protrusion side corner that is formed in a curved shape at an end of a locking surface with the locking recess.

In order to achieve the above mentioned object, a wire harness according to still another aspect of the present invention includes an electric wire; and an electronic component unit that is electrically connected to the electric wire, wherein the electronic component unit includes an electronic component, and a housing that houses the electronic components and is assembled to the holding member via a locking structure, the locking structure has a locking recess that is formed in a recessed shape on one of the housing and the holding member, and a locking protrusion that is formed in a protrusion shape capable of being fitted to the locking recess on the other of the housing or the holding member and capable of being locked to the locking recess, the locking recess has a recess side corner that is formed in a curved shape at an end of a locking surface with the locking protrusion, and the locking protrusion has a protrusion side corner that is formed in a curved shape at an end of a locking surface with the locking recess.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of the present invention will be described below in detail with reference to the drawings. The present invention is not limited to the embodiments. Further, constituent elements in the embodiments include elements easily replaceable by those skilled in the art or substantially identical elements.

Embodiment

Figure 1:
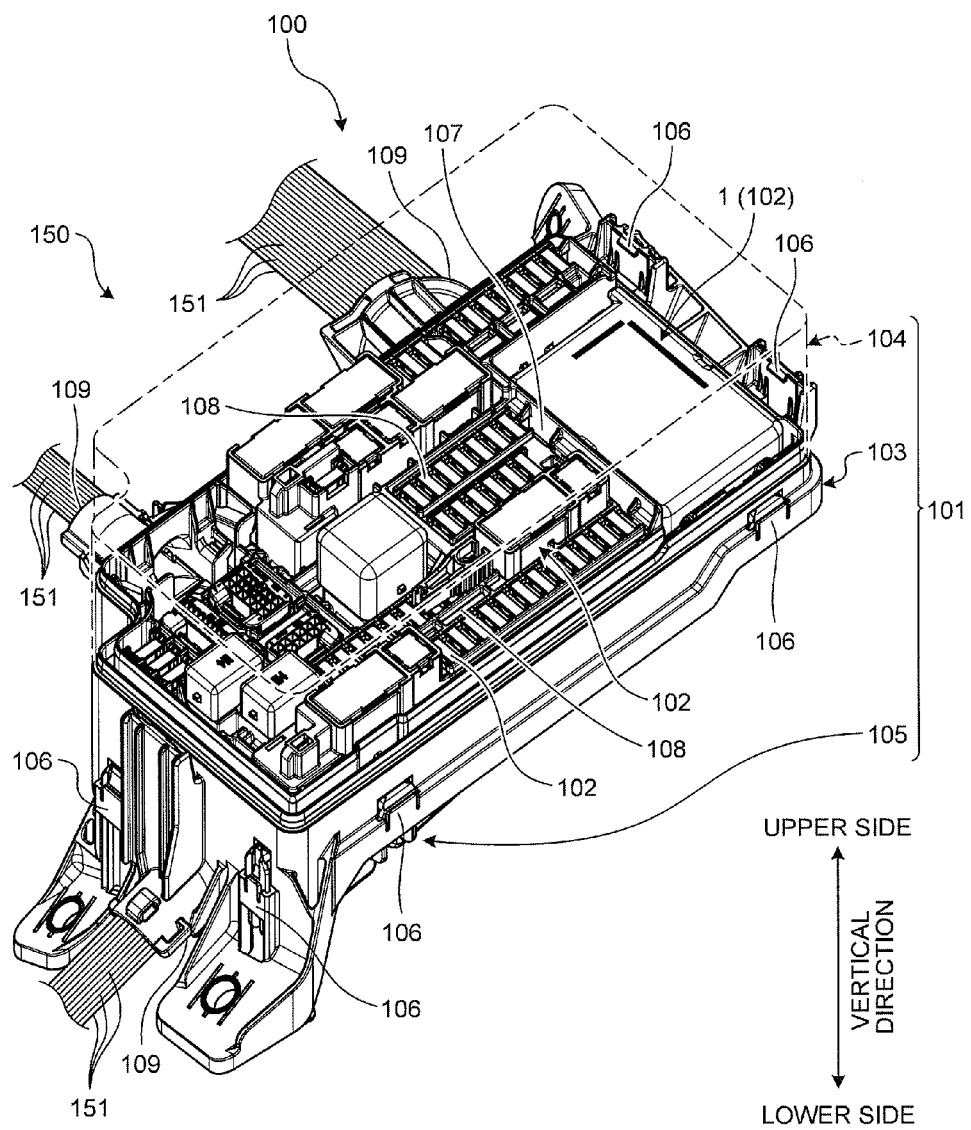
FIG. 1 is a perspective view illustrating a schematic structure of an electric connection box to which an electronic component unit according to an embodiment is applied.
Figure 2:
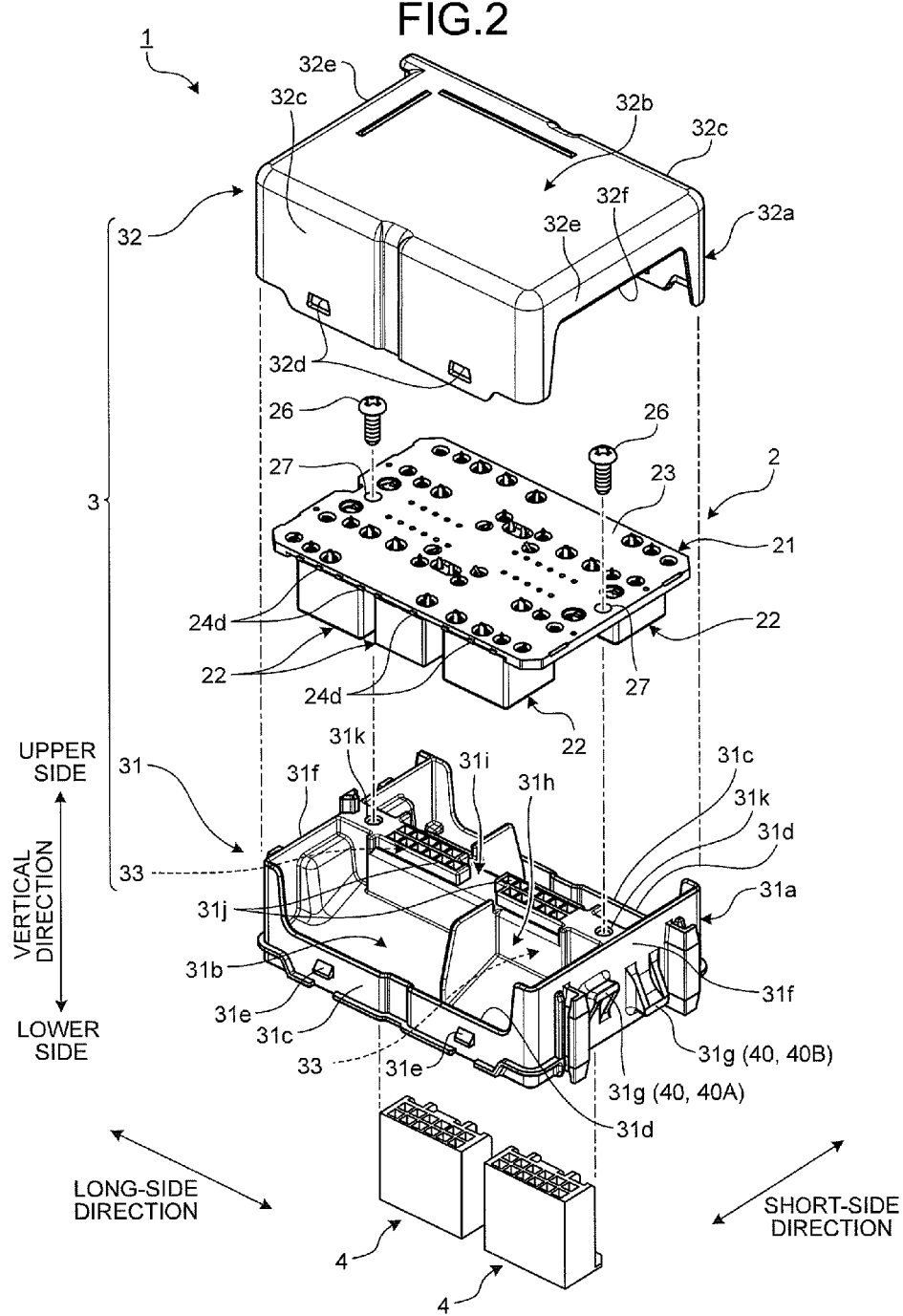
FIG. 2 is an exploded perspective view illustrating a schematic configuration of the electronic component unit according to the embodiment.
Figure 3:
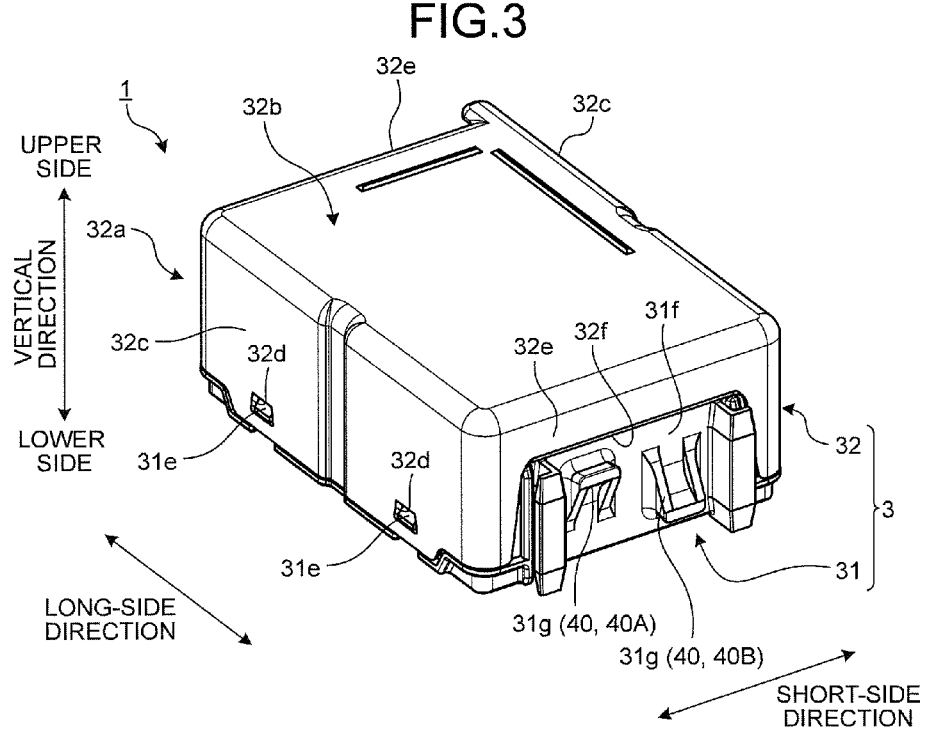
FIG. 3 is a perspective view illustrating a schematic configuration of the electronic component unit according to the embodiment.
Figure 4:
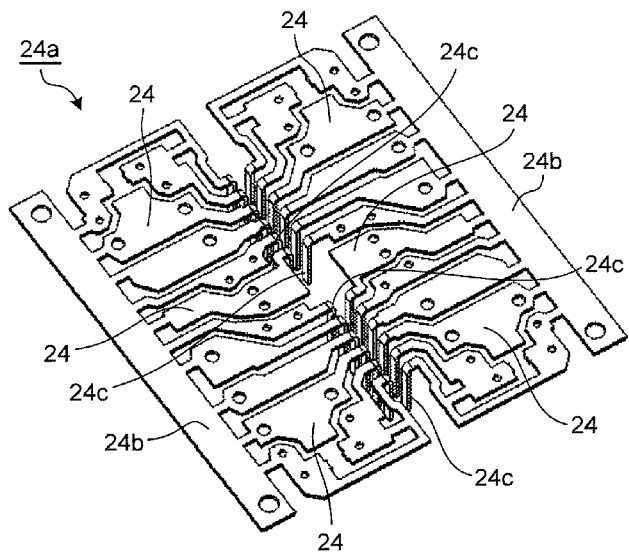
FIG. 4 is a perspective view illustrating a bus bar of the electronic component unit according to the embodiment.
Figure 5:
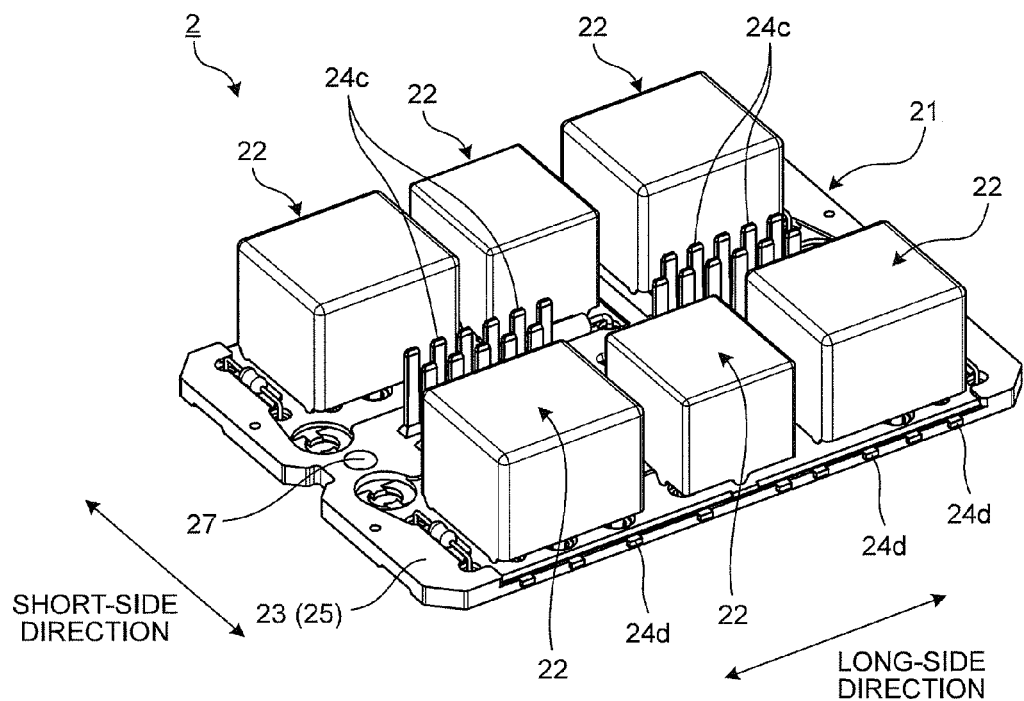
FIG. 5 is a perspective view illustrating a schematic configuration of an insert bus bar plate of the electronic component unit according to the embodiment.
Figure 6:
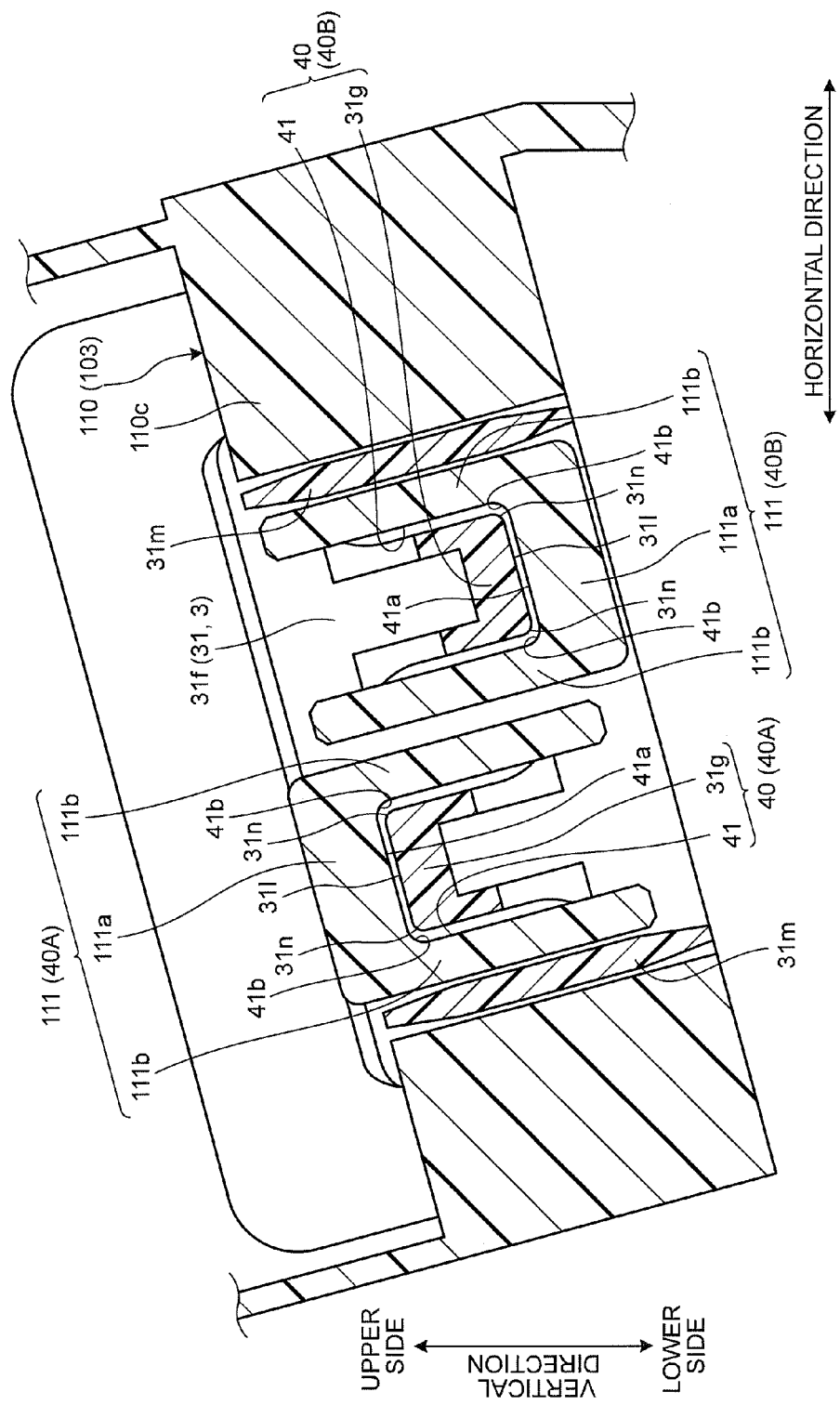
FIG. 6 is a cross-sectional view of a locking structure applied to the electronic component unit according to the embodiment.
Figure 7:
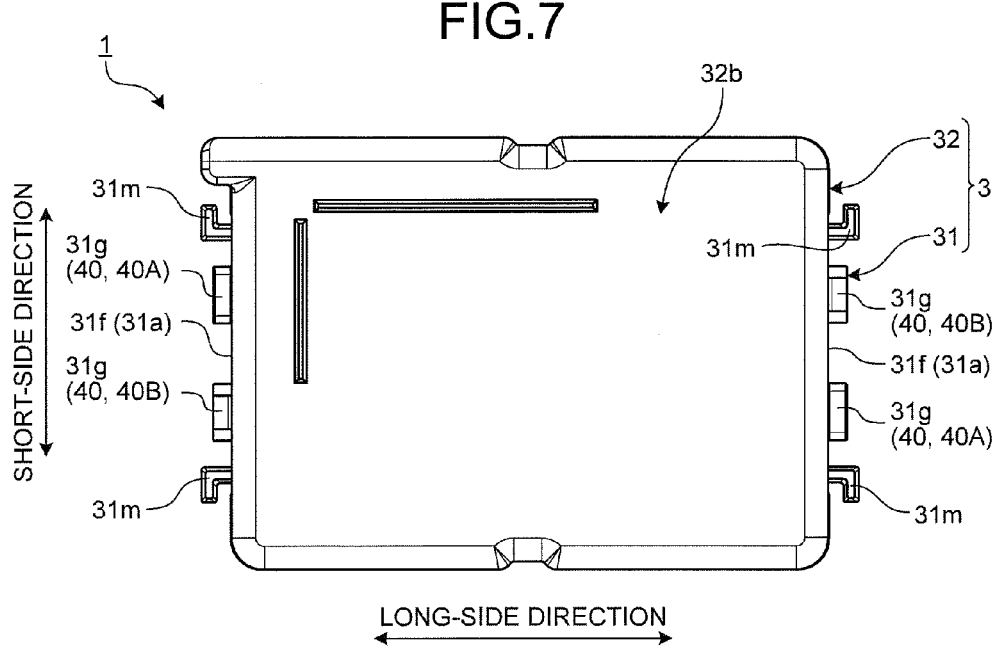
FIG. 7 is a top view of the electronic component unit according to the embodiment.
Figure 8:
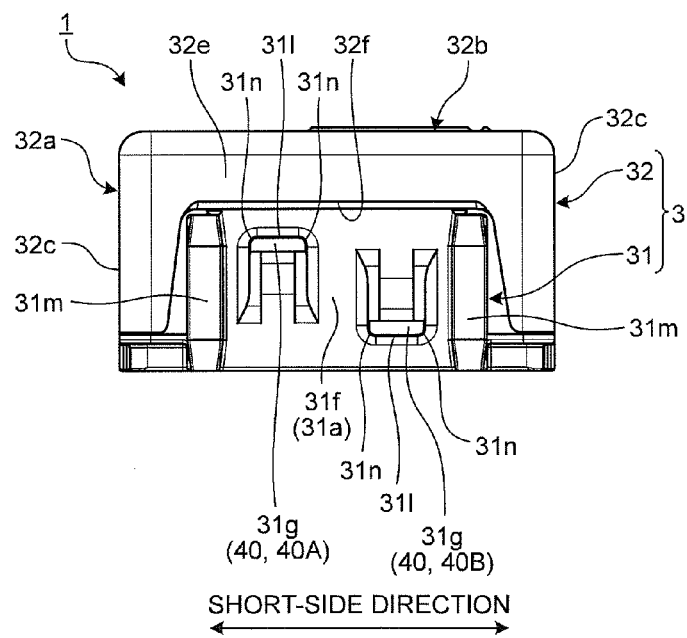
FIG. 8 is a side view of a short-side wall surface side of the electronic component unit according to the embodiment.
Figure 9:
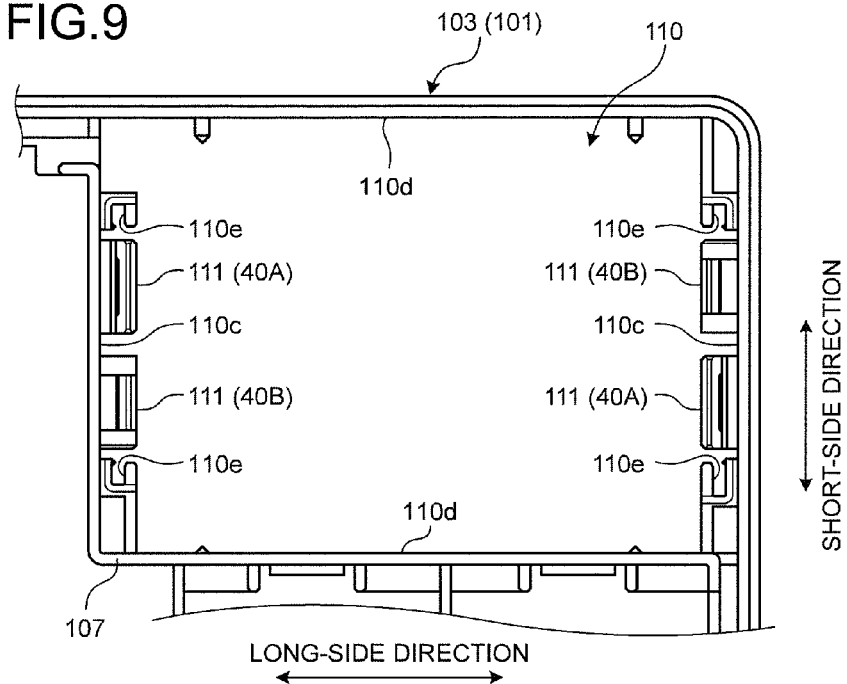
FIG. 9 is an enlarged top view of an electronic component unit housing in which the electronic component unit according to the embodiment is housed.
Figure 10:
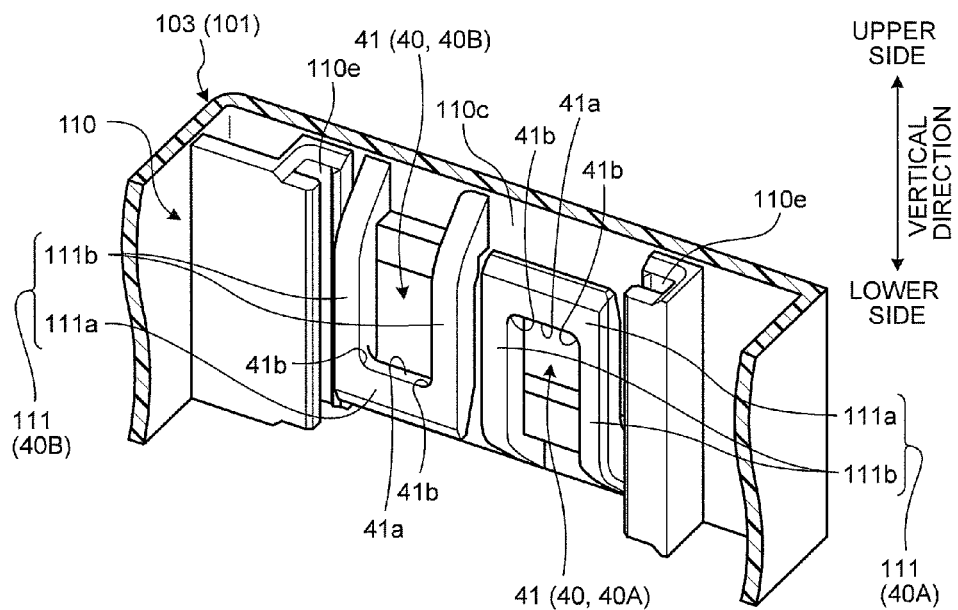
FIG. 10 is a partially cutaway enlarged perspective view of the electronic component unit housing in which the electronic component unit according to the embodiment is housed.
Figure 11:
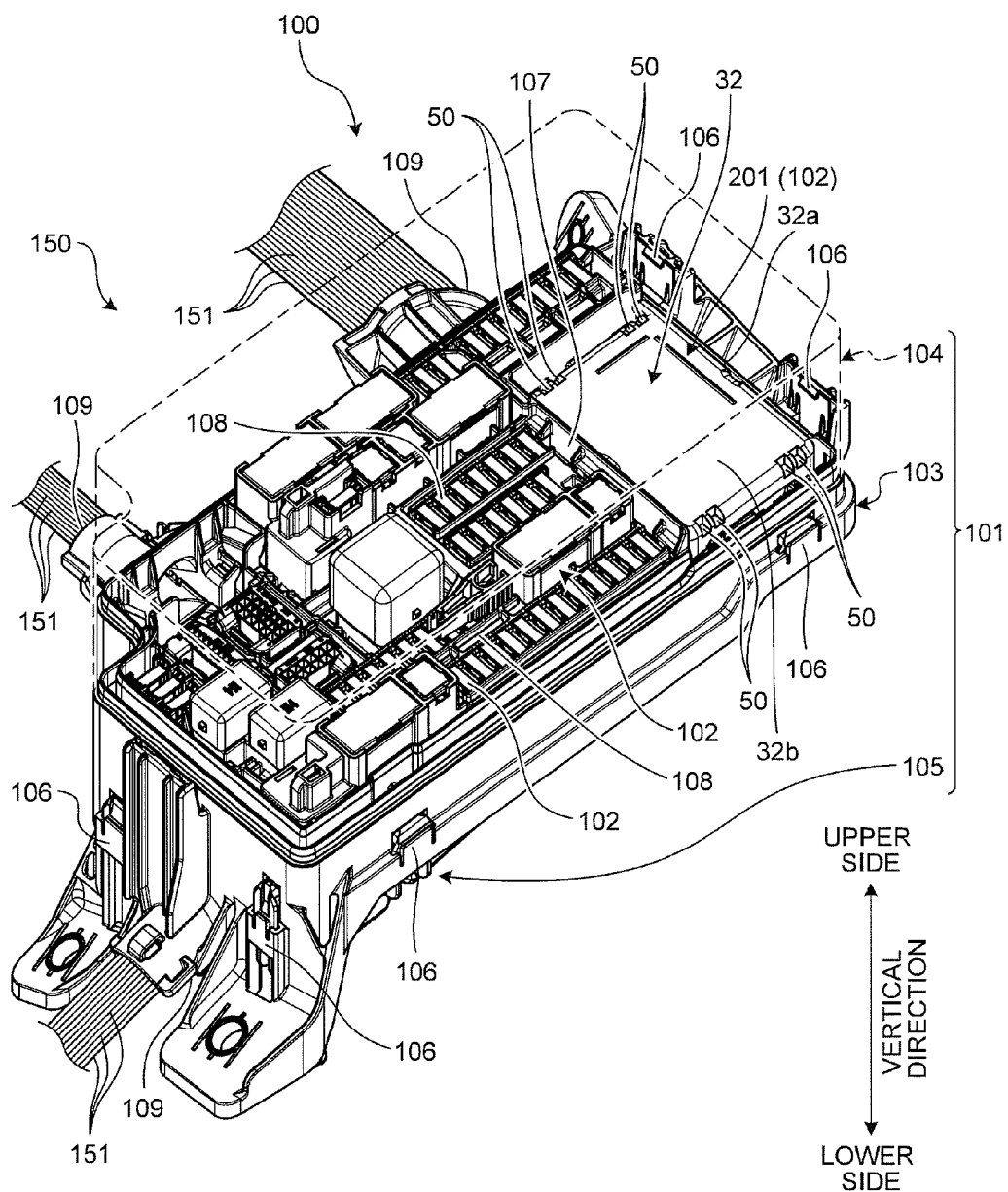
FIG. 11 is a perspective view illustrating a schematic configuration of an electric connection box to which an electronic component unit according to a modified example is applied.

FIG. 1 is a perspective view illustrating a schematic structure of an electric connection box to which the electronic component unit according to an embodiment is applied. FIG. 2 is an exploded perspective view illustrating a schematic configuration of the electronic component unit according to the embodiment. FIG. 3 is a perspective view illustrating a schematic configuration of the electronic component unit according to the embodiment. FIG. 4 is a perspective view illustrating a bus bar of the electronic component unit according to the embodiment. FIG. 5 is a perspective view illustrating a schematic configuration of an insert bus bar plate of the electronic component unit according to the embodiment. FIG. 6 is a cross-sectional view of a locking structure applied to the electronic component unit according to the embodiment. FIG. 7 is a top view of the electronic component unit according to the embodiment. FIG. 8 is a side view of a short-side wall surface side of the electronic component unit according to the embodiment. FIG. 9 is an enlarged top view of an electronic component unit housing in which the electronic component unit according to the embodiment is housed. FIG. 10 is a partially cutaway enlarged perspective view of the electronic component unit housing in which the electronic component unit according to the embodiment is housed. FIG. 11 is a perspective view illustrating a schematic configuration of an electric connection box to which an electronic component unit according to a modified example is applied. Further, FIGS. 1 and 11 illustrate an upper cover of the electric connection box with alternate long and two short dashes line.

As illustrated in FIG. 1, an electronic component unit 1 according to this embodiment constitutes an electronic component module that is detachably assembled to an electric connection box 100 mounted on a vehicle such as an automobile. Here, the electric connection box 100 is incorporated in a wire harness 150, and is intended to aggregate and house electric components such as a connector, a fuse, a relay, a branch portion and an electronic control unit that make up connection processing components such as electric wires therein. The wire harness 150 includes an electric wire 151, and an electric connection box 100 (the electronic component unit 1) electrically connected with the electric wire 151. The electric connection box 100, for example, is installed in an engine room of the vehicle and a lower portion of a vehicle body, and is connected between a power supply such as a battery and various electronic devices mounted inside the vehicle. The electric connection box 100 distributes the power supplied from the power supply into the various electronic devices in the vehicle. Although the electric connection box 100 is referred to as a junction box, a fuse box, a relay box or the like in some cases, in this embodiment, they are collectively referred to as an electric connection box.

In the electric connection box 100 illustrated in FIG. 1, various electronic components 102 are housed in a housing space inside a box main body 101 as a holding member. The box main body 101, for example, is configured to include a body 103, an upper cover 104, a lower cover 105 and the like. The box main body 101 has a three-layer division structure in which the body 103, the upper cover 104 and the lower cover 105 are divided. The body 103, the upper cover 104 and the lower cover 105 are formed of an insulating synthetic resin. The body 103 is a main member which forms the housing space in which the electronic components 102 are assembled. The body 103 is formed in a substantially square tubular shape, and in a state in which the electric connection box 100 is connected to the engine room or the like, an opening is located on a vertically upper side and a vertically lower side. The upper cover 104 is a lid-like member that closes the opening of the vertically upper side of the body 103. The lower cover 105 is a dish-like (tray-like) member that closes the opening of the vertically lower side of the body 103. In the box main body 101, the upper cover 104 is assembled to the vertically upper side of the body 103, and the lower cover 105 is assembled to the vertically lower side of the body 103 so that the opening of the vertically upper side of the body 103 faces the opening of the upper cover 104, and the opening of the vertically lower side of the body 103 faces the opening of the lower cover 105. In the box main body 101, the upper cover 104 and the lower cover 105 are locked with respect to the body 103 via various types of locking mechanisms 106. Further, a laminating direction of the body 103, the upper cover 104, and the lower cover 105 follows a vertical direction typically in a state in which the electric connection box 100 is connected to the engine room or the like. However, depending on the installation situations of the electric connection box 100, the laminating direction may be installed to have a predetermined angle with respect to the vertical direction.

Further, as the various electronic components 102 assembled to the housing space inside the box main body 101, the electronic component unit 1 of this embodiment is included, together with a connector, a fuse, a relay, a branch portion and an electronic control unit as described above. In the electric connection box 100, the above-described various electronic components 102 are assembled inside a plurality of cavities formed by various shapes of partition walls 107 integrally formed with the body 103, and various shapes of blocks 108 detachably assembled to the body 103. In this case, the partition wall 107, the block 108 and the like are also formed of an insulating synthetic resin, similarly to the body 103 or the like. Further, in the electric connection box 100, terminals or the like of the electric wire 151 wired via an opening 109 or the like are fitted and are electrically connected to the cavity in which various electronic components 102 are assembled, from the vertically lower side.

Further, as illustrated in FIGS. 2 to 5, the electronic component unit 1 of this embodiment includes an insert bus bar plate 2 as a plate, a housing 3 and a connector 4 as a connecting portion with the electric wire 151, and the insert bus bar plate 2 is assembled into the housing 3.

As illustrated in FIGS. 2, 4 and 5, the insert bus bar plate 2 is a substrate in which a metallic bus bar 24 is incorporated inside a resin material 23 and an electronic components 22 are mounted. The insert bus bar plate 2 is configured to include a substrate main body 21 and an electronic component 22.

The substrate main body 21 is configured so that a plurality of electrically conductive bus bars 24 is incorporated inside the resin material 23, in other words, the plurality of bus bars 24 is covered with the insulating resin material 23 to be insulated from each other. The substrate main body 21 is formed, for example, by insert-molding of injecting an insulating resin around the bus bars 24 disposed in a metal mold formed of a conductive metal to integrate the metal and resin.

A bus bar assembly 24a before molding illustrated in FIG. 4 illustrates an assembly of the bus bar 24 before insert-molding in which a plurality of bus bars 24 is connected by a carrier 24b. The bus bar assembly 24a before molding is formed by a conductive metal, and, for example, is formed in a substantially plate shape as a whole by press-machining or the like. The bus bar assembly 24a before molding is inserted into the insert molding metal mold in a state in which terminals 24c of each bus bar 24 are bent. The substrate main body 21 is formed by injecting an insulating resin around the bus bar assembly 24a before molding inserted to the metal mold to integrally mold each of the bus bars 24 and the resin material 23. Further, in the substrate main body 21, the carrier 24b is cut after integrally molding each of the bus bars 24 and the resin material 23. The substrate main body 21 is formed in a rectangular plate shape as a whole.

As illustrated in FIG. 5 or the like, in the insert-molded substrate main body 21, terminals 24c of the respective bus bars 24 are located at a substantially center of a short-side direction (a first width direction) side by side along a long-side direction (a second width direction perpendicular to the first width direction). Here, the terminals 24c are aligned in two rows along the long-side direction. Each terminal 24c is erected substantially perpendicularly to a mounting surface 25 that is a surface on which the electronic component 22 is mounted on the substrate main body 21. That is, the terminals 24c protrude and extend from the mounting surface 25 along a direction perpendicular to the short-side direction and the long-side direction. The respective terminals 24c are located between the plurality of electronic components 22 to be described later in the short-side direction. In other words, the plurality of terminals 24c is concentrated at the center of the mounting surface 25. Moreover, in the substrate main body 21, the end of the side of the bus bar 24 connected to the carrier 24b that is cut after the insert-molding becomes an exposed end 24d exposed from the resin material 23 at the end surface of the substrate main body 21. That is, in the insert bus bar plate 2, a plurality of exposed ends 24d of the bus bar 24 is exposed to the end surface. The exposed ends 24d are formed on each of a pair of long-side end surfaces facing each other in the substrate main body 21. A plurality of exposed ends 24d is exposed side by side in the long-side direction at each long-side end surface.

The electronic component 22 is mounted on the mounting surface 25 of the substrate main body 21, and here, the electronic component 22 is an element which exhibits various functions. The respective terminals of the electronic component 22 are electrically connected to a predetermined bus bar 24, and the electronic component 22 is fixed on the rear surface of the mounting surface 25 by soldering or the like. The electronic component 22 of the present embodiment, for example, is a relay. That is, the electronic component unit 1 of this embodiment is a relay unit module. In the insert bus bar plate 2 of this embodiment, total six relays as the electronic components 22 are provided so that three relays are provided side by side on each of both sides in the short-side direction of the respective terminals 24c along the long-side direction. In other words, in the insert bus bar plate 2, the electronic components 22 are arranged in two rows, and a plurality of terminals 24c is disposed in two rows between the electronic components 22 of the two rows. The insert bus bar plate 2 of the present embodiment is basically in the form of a substantially linear symmetry with respect to the center line (that is, the center line in the short-side direction) along the long-side direction of the substrate main body 21, and the placement of the terminal 24c and the electronic component 22 is a substantially linear symmetry. Further, an element such as a relay resistance is also mounted on the insert bus bar plate 2, in addition to the six relays as the electronic component 22.

As illustrated in FIGS. 2 and 3, the housing 3 holds the assembled insert bus bar plate 2. The housing 3 of the present embodiment has a base cover 31 as a base section, a top cover 32 as a lid and a connector fitting portion 33 as a connection fitting portion, and the insert bus bar plate 2 is assembled to the inside partitioned by the base cover 31 and the top cover 32. The insert bus bar plate 2 is assembled to the base cover 31. The top cover 32 covers the insert bus bar plate 2 assembled to the base cover 31 from the opposite side of the base cover 31. The connector 4 as a connecting portion between the terminal 24c of the bus bar 24 and the electric wire 151 is fitted to the connector fitting portion 33, and the connector fitting portion 33 is integrally formed on the base cover 31. The base cover 31, the top cover 32 and the connector fitting portion 33 are formed of an insulating synthetic resin.

Specifically, as illustrated in FIG. 2, the base cover 31 is a dish-like (tray-like) member. The base cover 31 is configured to include a rectangular frame-like section 31a as a wall formed in a substantially square shape, and a bottom 31b that closes the rectangular frame-like section 31a. The bottom 31b is formed in a rectangular plate shape having the same shape as the substrate main body 21 of the insert bus bar plate 2. The rectangular frame-like section 31a is formed to surround the edge of the bottom 31b. The bottom 31b is formed integrally with the rectangular frame-like section 31a in the middle of the rectangular frame-like section 31a (see FIG. 7 or the like). In the rectangular frame-like section 31a, notches 31d are formed in each of a pair of long-side wall surfaces 31c along the long-side direction of the bottom 31$b$, and engaging claws 31$e$ for being engaged to the top cover 32 are formed. Further, in the rectangular frame-like section 31$a$, locking claws 31$g$ for being engaged to the box main body 101 of the electric connection box 100 as a holding member are formed in each of a pair of short-side wall surfaces 31$f$ along the short-side direction of the bottom 31$b$. Further, the locking claw 31$g$ will be described in detail later. The base cover 31 is formed in a rectangular tubular shape (partially cut by the notch 31$d$) in which the middle of the rectangular frame-like section 31$a$ is blocked by the bottom 31$b$. In the base cover 31, a space surrounded by the rectangular frame-like section 31$a$ and the bottom 31$b$ is divided as a housing space 31$h$ that houses the electronic components 22 of the insert bus bar plate 2.

In the base cover 31, a central wall-shaped section 31$i$ is formed at the center of the bottom 31$b$. The central wall-shaped section 31$i$ is formed so that the bottom 31$b$ protrudes into the housing space 31$h$ side. The central wall-shaped section 31$i$ is formed along the long-side direction at the substantially center in the short-side direction of the bottom 31$b$. The central wall-shaped section 31$i$ extends from one short-side wall surface 31$f$ to the other short-side wall surface 31$f$ along the long-side direction. On the leading end surface of the central wall-shaped section 31$i$, a plurality of terminal fitting holes 31$j$ and a pair of screw holes 31$k$ are formed. The terminal fitting holes 31$j$ are holes to which the terminals 24$c$ of the respective bus bars 24 described above are fitted, when the insert bus bar plate 2 is assembled to the base cover 31, and the terminal fitting holes are formed by the number and at the positions corresponding to the respective terminals 24$c$. Here, the terminal fitting holes 31$j$ are aligned in two rows along the long-side direction. Screw holes 31$k$ are holes to which screws 26 for fastening the insert bus bar plate 2 to the base cover 31 are screwed, when the insert bus bar plate 2 is assembled to the base cover 31.

Furthermore, in the base cover 31, the rear surface side of the central wall-shaped section 31$i$, that is, the opposite side to the housing space 31$h$ has a hollow shape, and the hollow section is formed as a connector fitting portion 33 to which the connector 4 serving as a connecting portion with the electric wire 151 is fitted. The terminal 24$c$ of the above-described bus bars 24 is exposed into the connector fitting portion 33 via the respective terminal fitting holes 31$j$ in a state in which the insert bus bar plate 2 is assembled to the base cover 31. Here, the connector fitting portions 33 are formed at two locations, and total two connectors 4 are fitted so that each connector is fitted to each of the two connector fitting portions 33. That is, in the electronic component unit 1 of this embodiment, the two connectors 4 are connected to the terminals 24$c$ of the plurality of bus bars 24.

As illustrated in FIGS. 2 and 3, the top cover 32 is a lid-like member. The top cover 32 is configured to include a rectangular frame-like section 32$a$ as the wall body formed in the substantially square shape, and a ceiling 32$b$ that closes one opening of the rectangular frame-like section 32$a$. The ceiling 32$b$ is formed in a rectangular plate shape having the same shape as the substrate main body 21 of the insert bus bar plate 2, and the bottom 31$b$ of the base cover 31. The rectangular frame-like section 32$a$ is formed so as to be erected at the edge of the ceiling 32$b$. In the rectangular frame-like section 32$a$, engaging recesses 32$d$ for being locked to the base cover 31 are formed on a pair of long-side wall surfaces 32$c$ along the long-side direction of the ceiling 32$b$. Further, in the rectangular frame-like section 32$a$, notches 32$f$ are formed on each of a pair of short-side wall surfaces 32$e$ along the short-side direction of the ceiling 32$b$.

The top cover 32 is formed in a rectangular tubular shape (partially cut by the notch 32$f$) in which one end is open and the other end is closed by the rectangular frame-like section 32$a$ and the ceiling 32$b$.

As illustrated in FIGS. 2 and 3, the electronic component unit 1 configured as described above constitutes a single module by the connector 4 fitted to the connector fitting portion 33 in a state in which the insert bus bar plate 2 is assembled to the base cover 31, and the opposite side of the insert bus bar plate 2 to the base cover 31 is covered with the top cover 32.

More specifically, in the electronic component unit 1, in a positional relation in which the electronic component 22 of the insert bus bar plate 2 is housed in the housing space 31$h$ of the base cover 31, that is, in a positional relation in which the mounting surface 25 (see FIG. 5) on which the electronic component 22 is mounted faces the bottom 31$b$ of the base cover 31, the insert bus bar plate 2 is assembled to the base cover 31. In the electronic component unit 1, in a state in which the insert bus bar plate 2 is assembled to the base cover 31, the terminals 24$c$ of the plurality of bus bars 24 of the insert bus bar plate 2 are fitted to the respective terminal fitting holes 31$j$ of the base cover 31, and the terminals 24$c$ are exposed to the interior of the connector fitting portion 33 in a direction perpendicular to the short-side direction and the long-side direction. In the electronic component unit 1, when the screw 26 is inserted into a screw hole 27 of the insert bus bar plate 2 and is screwed with the screw hole 31$k$ of the base cover 31, the insert bus bar plate 2 and the base cover 31 are fastened. In the electronic component unit 1, in a state in which the insert bus bar plate 2 is assembled to the base cover 31, each of the three electronic components 22 is located on both sides in the short-side direction of the central wall-shaped section 31$i$.

In the electronic component unit 1, in a positional relation in which the insert bus bar plate 2 assembled to the base cover 31 is covered with the top cover 32 from the opposite side of the base cover 31, the top cover 32 is mounted on the base cover 31 or the like. In the electronic component unit 1, in a state in which the top cover 32 is attached at an appropriate position, when the respective engaging recesses 32$d$ of the top cover 32 side are engaged with the respective engaging claw 31$e$ of the base cover 31 side, the top cover 32 is assembled to the base cover 31. As illustrated in FIG. 3 or the like, in the electronic component unit 1, in a state in which the top cover 32 is assembled to the base cover 31, the rectangular frame-like section 32$a$ of the top cover 32 is located to overlap the outside of the rectangular frame-like section 31$a$ of the base cover 31, and the locking claw 31$g$ is exposed from the notch 32$f$ of the top cover 32. Further, in the electronic component unit 1, when the connector 4 is fitted to the connector fitting portion 33 along a direction perpendicular to the short-side direction and the long-side direction, the connector 4 is connected to the terminals 24$c$ of the plurality of bus bars 24 and is assembled at a predetermined position inside the box main body 101 of the electric connection box 100 via the respective locking claws 31$g$.

Further, the laminating direction of the base cover 31, the insert bus bar plate 2 and the top cover 32 follows the vertical direction in a state in which the electric connection box 100 is connected to the engine room or the like similarly to the above-described electric connection box 100. However, in some cases, depending on the installation situations of the electric connection box 100, the electric connection box may be installed so that the laminating direction has a predetermined angle with respect to the vertical direction.

Incidentally, in the electronic component unit 1 of this embodiment, the housing 3 is assembled to the box main body 101 as a holding member via a locking structure 40 configured to include respective locking claws 31g. Here, the electronic component unit 1 is formed on the inner wall surface of the body 103 (see FIG. 1) that forms the box main body 101 as a holding member. Further, since the locking structure 40 of this embodiment is formed in a predetermined shape, improvement in durability is achieved.

Specifically, as illustrated in FIGS. 6, 7, 8, 9 and 10, the locking structure 40 includes a locking recess 41 and a locking claw 31g as a locking protrusion. The locking recess 41 is formed in a recessed shape in one of the housing 3 and the body 103, here, in the body 103. The locking claw 31g can be locked to the locking recess 41 formed in a protruding shape engageable with the locking recess 41 on the other of the housing 3 and the body 103, here, in the base cover 31 of the housing 3.

In the electronic component unit 1 of this embodiment, a pair of locking claws 31g and locking recesses 41 are defined as a set, and four sets of locking structures 40 are provided. Here, each of the two sets of locking structure 40 is provided on the short-side wall surface 31f of the base cover 31. Further, one of the locking structures 40 provided by two sets on each short-side wall surface 31f forms a first locking structure 40A, and the other thereof forms a second locking structure 40B. The first locking structure 40A is a locking structure 40 that locks the housing 3 to the body 103 when assembling the housing 3 to the body 103 in the first direction, here, from vertically upper side, and prevents the housing 3 from escaping vertically upward from the body 103. Meanwhile, the second locking structure 40B is a locking structure 40 that locks the housing 3 to the body 103 when assembling the housing 3 to the body 103 in the second direction opposite to the first direction, here, from the vertically lower side, and prevents the housing 3 from escaping vertically downward from the body 103. Further, in the following description, when there is no need to particularly distinguish the first locking structure 40A and the second locking structure 40B, they are simply referred to as the locking structure 40, and the common description will be provided.

As illustrated in FIGS. 7 and 8, the locking claws 31g of each locking structure 40 are provided on each surface of the short-side wall surface 31f of the base cover 31. The locking claws 31g are formed to protrude in an outward direction (for example, a normal direction of the short-side wall surface 31f) from the top of the surface of the short-side wall surface 31f. The locking claws 31g of the first locking structure 40A and the locking claws 31g of the second locking structure 40B are arranged side by side along the short-side direction in each of the short-side wall surfaces 31f, and when the short-side wall surface 31f is viewed from outside, the locking claws 31g of the first locking structure 40A are disposed on the left side in the short-side direction, and the locking claws 31g of the second locking structure 40B are disposed on the right side in the short-side direction. In addition, the locking claws 31g of the first locking structure 40A and the locking claws 31g of the second locking structure 40B are provided so that the respective vertical positions are different from each other, and the vertical position of the locking claws 31g of the first locking structure 40A is disposed above the locking claws 31g of the second locking structure 40B.

As illustrated in FIGS. 9 and 10, the locking recesses 41 of each locking structure 40 are formed as recess-shaped sections on an inner wall surface of an electronic component unit housing 110 provided on the body 103.

Here, the electronic component unit housing 110 is a section that houses the electronic component unit 1 and that constitutes a cavity formed in a part of the body 103. The electronic component unit housing 110 is formed in the housing space of the body 103 by a partition wall 107, and is formed in a rectangular shape that is substantially the same shape as the electronic component unit 1 in a plan view (as viewed in the vertical direction) to allow the electronic component unit 1 to be fitted onto the inner circumferential side. The electronic component unit housing 110 has a pair of the short-side inner circumferential surfaces 110c and a pair of long-side inner circumferential surfaces 110d, as a plurality of inner circumferential surfaces disposed on the outer circumferential side of the outer circumferential surface of the electronic component unit 1, when fitting the electronic component unit 1. The short-side inner circumferential surface 110c faces the short-side wall surface 31f and the short-side wall surface 32e in a state in which the electronic component unit 1 is housed in the electronic component unit housing 110. The long-side inner circumferential surface 110d faces the long-side wall surface 32c in a state in which the electronic component unit 1 is housed in the electronic component unit housing 110. The electronic component unit housing 110 is open on both the vertically upper and lower sides. The electronic component unit 1 is configured so that it can be fitted to the electronic component unit housing 110 from the vertically upper side and can also be fitted to the electronic component unit housing 110 from the vertically lower side. That is, the electronic component unit 1 is attachable to and detachable from the body 103 of the electric connection box 100 from both the vertically upper and lower sides.

Further, in the electronic component unit housing 110, on the short-side inner circumferential surfaces 110c, total four lock arms 111 are provided so that each lock arm is provided at the position facing the respective locking claws 31g. The lock arm 111 is arranged side by side along the short-side direction, and when the short-side inner circumferential surface 110c is viewed from the inside, the lock arm 111 facing the locking claw 31g of the first locking structure 40A (hereinafter, simply referred to as a "lock arm 111 of the first locking structure 40A", in some cases) is disposed on the right side in the short-side direction, and the lock arm 111 facing the locking claw 31g of the second locking structure 40B (hereinafter, simply referred to as a "lock arm 111 of the second locking structure 40B", in some cases) is disposed on the left side in the short-side direction. Further, although the lock arm 111 of the first locking structure 40A and the lock arm 111 of the second locking structure 40B are made up of the same constituent, each constituent is disposed by being inverted in the vertical direction.

Each lock arm 111 has a locking shaft 111a extending in the short-side direction, and a pair of arm portions 111b that connect the both ends of the locking shaft 111a and the short-side inner circumferential surface 110c. The locking shaft 111a is a section formed in a rectangular plate shape. A pair of arm portions 111b extends parallel to each other along a direction in which the electronic component unit housing 110 is open (a fitting direction of the electronic component unit 1), one end is connected to the short-side inner circumferential surface 110c to constitute a proximal end, and the other end constitutes a leading end to support both ends of the locking shaft 111a. Gaps of each pair of arm portions 111b is taken larger than the length in the short-side direction of the locking claw 31g so that the locking claw 31g can be fitted between the pair of arm portions 111b. The locking shaft 111a extends along a direction that intersects with the extending direction of the arm portion 111b (a direction intersecting with the fitting direction of the electronic component unit 1). Here, in the lock arm 111 of the first locking structure 40A, the leading ends of the pair of arm portions 111b are oriented to the vertically upper side, and the locking shaft 111a is located on the vertically upper side. Meanwhile, in the lock arm 111 of the second locking structure 40B, the leading ends of the pair of arm portions 111b are oriented in the vertically lower side, and the locking shaft 111a is located on the vertically lower side.

The locking recesses 41 of each locking structure 40 are divided by the locking shaft 111a and a pair of arm portions 111b constituting each lock arm 111. That is, the locking recess 41 is a space section that is surrounded in a substantially U shape by the locking shaft 111a and the pair of arm portions 111b. That is, the locking recess 41 of the first locking structure 40A is formed by the lock arm 111 of the first locking structure 40A, is open vertically downward, and is configured to be able to insert the locking claw 31g into the gap of the pair of arm portions 111b from the vertically lower side. The locking recess 41 of the second locking structure 40B is formed by the lock arm 111 of the second locking structure 40B, is open vertically upward, and is configured to be able to insert the locking claw 31g into the gap of the pair of arm portions 111b from the vertically upper side. Here, in other words, the locking recess 41 is formed as a recess-shaped section by a through-hole passing through the respective lock arms 111. However, the locking recess may not penetrate, that is, the locking recess may be formed as a bottomed hole-like recess, without being limited thereto.

As illustrated in FIGS. 6 and 8, in each locking structure 40 configured as described above, a predetermined surface of the locking claw 31g constitutes a protrusion side locking surface 31l that is a locking surface (a lock surface) with the locking recess 41. The locking claw 31g of the first locking structure 40A constitutes a protrusion side locking surface 31l in which the vertically upper surface is locked by abutting against the locking shaft 111a that divides the locking recess 41. The locking claw 31g of the second locking structure 40B constitutes protrusion side locking surface 31l in which the vertically lower side surface is locked by abutting against the locking shaft 111a that divides the locking recess 41. Moreover, as illustrated in FIGS. 6 and 10, each locking structure 40 constitutes a recess side locking surface 41a in which a predetermined surface of the locking recess 41 is a locking surface (lock surface) with the locking claw 31g. The locking recess 41 of the first locking structure 40A constitutes a recess side locking surface 41a in which the vertically lower side surface of the locking shaft 111a abuts against the protrusion side locking surface 31l of the locking claw 31g. The locking recess 41 of the second locking structure 40B constitutes a recess side locking surface 41a in which the vertically upper surface of the locking shaft 111a abuts against the protrusion side locking surface 31l of the locking claw 31g. In each locking structure 40, when each locking claw 31g of the electronic component unit 1 side is inserted into the locking recess 41 formed by the lock arm 111 of the body 103 side, and a contact state between the protrusion side locking surface 31l and the recess side locking surface 41a is maintained, the locking claw 31g is locked to each locking recess 41. As a result, each locking structure 40 can lock and assemble the housing 3 of the electronic component unit 1 to the body 103. Thus, the electronic component unit 1 can be prevented from escaping from the body 103. More specifically, in a state in which the electronic component unit 1 is fitted to the electronic component unit housing 110, when the locking claw 31g of the first locking structure 40A is locked to the locking recess 41, the electronic component unit 1 is prevented from escaping vertically upward from the body 103. Meanwhile, in a state in which the electronic component unit 1 is fitted to the electronic component unit housing 110, when the locking claw 31g of the second locking structure 40B is locked to the locking recess 41, the electronic component unit 1 is prevented from escaping vertically downward from the body 103.

Further, as illustrated in FIGS. 6, 7 and 8, in the electronic component unit 1 of this embodiment, a pair of guide members 31m is provided on the short-side wall surface 31f on both end sides in the short-side direction of the two locking claws 31g. In addition, as illustrated in FIGS. 9 and 10, in the electronic component unit housing 110, a guide receiving section 110e is provided on the short-side inner circumferential surface 110c. The guide receiving section is fitted to the guide member 31m to guide the guide member 31m, when the electronic component unit 1 is fitted to the electronic component unit housing 110. The guide member 31m is provided to extend to the positions of the upper and lower sides of the vertical positions of the two locking claws 31g provided on the same surface. Thus, when the electronic component unit 1 is fitted to the electronic component unit housing 110 from one of the top and bottom in the vertical direction, before the locking claw 31g is locked to the locking recess 41, since the guide member 31m is fitted to the guide receiving section 110e, it is possible to easily perform positioning of the electronic component unit 1 to the electronic component unit housing 110.

As illustrated in FIGS. 6, 8 and 10, in each locking structure 40 of this embodiment, the locking recess 41 has a recess side corner 41b of a predetermined shape, and the locking claw 31g has a protrusion side corner 31n of a predetermined shape.

The recess side corner 41b is formed in a curved shape at the end of the recess side locking surface 41a, and the protrusion side corner 31n is formed in a curved shape at the end of the protrusion side locking surface 31l. Here, the recess side corners 41b are formed at both ends of the recess side locking surface 41a, and similarly, the protrusion side corners 31n are formed at both ends of the protrusion side locking surface 31l. More specifically, the recess side locking surface 41a is formed in a curved shape in the connecting portion between the locking shaft 111a of the lock arm 111 and the arm portion 111b. The protrusion side corner 31n is formed at the position facing the recess side locking surface 41a in a state in which the locking claw 31g is locked to the recess side locking surface 41a, that is, on both shoulders of the locking claw 31g. Further, typically, a curvature of the protrusion side corner 31n is set to be equal to or less than a curvature of the recess side corner 41b.

According to the above-described locking structure 40, it includes the locking recess 41 formed in a recessed shape in one of the housing 3 that houses the electronic component 22, and the body 103 to which the housing 3 is assembled; and the locking claw 31g formed in a protrusion shape fittable to the locking recess 41 on the other of the housing 3 or the body 103 and lockable to the locking recess 41. The locking recess 41 has a recess side corner 41b formed in a curved shape at an end of the recess side locking surface 41a that is a locking surface with the locking claw 31g, and the locking claw 31g has a protrusion side corner 31n that is formed in a curved surface shape at the end of the protrusion side locking surface 31*l* as the locking surface with the locking recess 41 and faces the recess side corner 41*b*. According to the electronic component unit 1 as described above, it includes the electronic component 22, and the housing 3 that houses the electronic component 22 and is assembled to the body 103 via the locking structure 40. According to the wire harness 150 as described above, it includes the electric wire 151, and the electronic component unit 1 that is electrically connected to the electric wire 151.

Therefore, the locking structure 40, the electronic component unit 1 and the wire harness 150 can lock and assemble the housing 3 in which electronic components 22 are housed to the body 103, when the locking claw 31*g* is locked to the locking recess 41. Further, according to the locking structure 40, the electronic component unit 1 and the wire harness 150, since the recess side corner 41*b* of the end of the recess side locking surface 41*a* of the locking recess 41, and the protrusion side corner 31*n* of the end of the protrusion side locking surface 31*l* of the locking claw 31*g* are both formed in a curved shape, it is possible to bring the recess side corner 41*b* and the protrusion side corner 31*n* into surface-contact with each other, in other words, it is possible to avoid the point contact. Thus, the locking structure 40, the electronic component unit 1 and the wire harness 150 can relax the stress concentration on the recess side corner 41*b* and the protrusion side corner 31*n*. As a result, the locking structure 40, the electronic component unit 1 and the wire harness 150 can improve the durability.

Furthermore, according to the locking structure 40 as described above, the curvature of the protrusion side corner 31*n* is equal to or less than the curvature of the recess side corner 41*b*. Therefore, according to the locking structure 40, the electronic component unit 1 and the wire harness 150, since the curved surface of the protrusion side corner 31*n* can be the same as or can be relax than the curved surface of the recess side corner 41*b*, it is possible to allow the protrusion side corner 31*n* to reliably abut against the recess side corner 41*b*, thereby relaxing the stress concentration.

Here, according to the locking structure 40 as described above, as described above, depending on the installation situations of the electric connection box 100, in a state in which the housing 3 is assembled to the body 103, in some cases, the recess side locking surface 41*a* and the protrusion side locking surface 31*l* may be inclined with respect to the horizontal direction (for example, see FIG. 6). In the locking structure 40, when the laminating direction of the base cover 31, the insert bus bar plate 2 and the top cover 32 has a predetermined angle with respect to the vertical direction, and the recess side locking surface 41*a* and the protrusion side locking surface 31*l* are inclined with respect to the horizontal direction, in a state in which the electric connection box 100 is mounted on the vehicle, for example, there is a tendency that the recess side corner 41*b* and the protrusion side corner 31*n* are likely to collide with each other with the vertical movement depending on the vehicle vibration or the like. Also, in this case, in the locking structure 40, the vertical clearance is likely to relatively increase under the influence of the clearance or the like which is set between the locking recess 41 (the lock arm 111) and the locking claw 31*g*, and as compared to a case where the recess side locking surface 41*a* and the protrusion side locking surface 31*l* are horizontally installed, a relatively movable distance between the protrusion side corner 31*n* and the recess side corner 41*b* tends to relatively increase. Thus, in the locking structure 40, in a state in which the electric connection box 100 is mounted on the vehicle, for example, an amount of stroke at the time of collision of the protrusion side corner 31*n* and the recess side corner 41*b* with the vertical movement depending on the vehicle vibration or the like relatively increases, and as a result, collision energy tends to relatively increase in the collision.

In contrast, by forming the recess side corner 41*b* and the protrusion side corner 31*n* in a curved shape as described above, the locking structure 40, the electronic component unit 1 and the wire harness 150 relax the stress concentration upon the collision between the protrusion side corner 31*n* and the recess side corner 41*b*. Therefore, according to the locking structure 40, the electronic component unit 1 and the wire harness 150, even when the electronic component unit 1 is installed to be inclined and the collision energy between the recess side corner 41*b* and the protrusion side corner 31*n* is relatively large, it is possible to appropriately improve the durability. In other words, the locking structure 40, the electronic component unit 1 and the wire harness 150 can remarkably exhibit the effect of improving durability, by being applied to a case where the recess side locking surface 41*a* and the protrusion side locking surface 31*l* are inclined with respect to the horizontal direction.

Also, according to the locking structure 40 as described above, the recess side corners 41*b* are formed at both ends of the recess side locking surface 41*a*, and the protrusion side corners 31*n* are formed at both ends of the protrusion side locking surface 31*l*. Therefore, the locking structure 40, the electronic component unit 1 and the wire harness 150 can appropriately improve the durability, even when a position where a collision energy between the recess side locking surface 41*a* and the protrusion side locking surface 31*l* is likely to relatively increases and the position changes, depending on the state of the clearance between the locking recess 41 (lock arm 111) and the locking claw 31*g*, and the degree of the slope of the electronic component unit 1, the recess side locking surface 41*a* and the protrusion side locking surface 31*l*. That is, the locking structure 40, the electronic component unit 1 and the wire harness 150 can easily improve durability, even when the electronic component unit 1, the recess side locking surface 41*a* and the protrusion side locking surface 31*l* are installed at any slope angle, that is, it is possible to improve versatility.

Furthermore, according to the locking structure 40 as described above, the locking recess 41 is divided by the locking shaft 111*a* in which the recess side locking surface 41*a* is formed, and a pair of arm portions 111*b* that supports both ends of the locking shaft 111*a*, and the recess side corner 41*b* is formed in the connecting portion between the locking shaft 111*a* and the arm portion 111*b*. Therefore, the locking structure 40, the electronic component unit 1 and the wire harness 150 form the locking recess 41 by the locking shaft 111*a* and the arm portion 111*b*, and can lock the locking claw 31*g* to the locking recess 41.

Further, the locking structure, the electronic component unit and the wire harness according to the embodiment of the present invention can be variously modified within the scope of the claims, without being limited to the above-described embodiments.

Although the description has been given of a case where the electronic component unit 1 constitutes an electronic component module detachably assembled to the electric connection box 100, it is not limited thereto. The configuration of the electronic component unit of this embodiment, for example, may be applied to the electric connection box 100 itself.

The electronic component 22 described above is described as a relay, but it is not limited thereto, and may be a fuse or the like.

In the above description, although the description has been given of a case where the housing 3 has a base cover 31 (base section) and the top cover 32 (*lid*), and the insert bus bar plate 2 is assembled to the inside, it is not limited thereto. The housing 3 may be configured so that the insert bus bar plate 2 may be assembled to the top cover 32, and each of the base cover 31 and the top cover 32 may not be separately configured.

In the above description, the locking structure 40 has been described such that the locking recess 41 is formed in the body 103 as a holding member, and the locking claw 31*g* is formed in the housing 3, but it is not limited thereto. The locking recess 41 may be formed in the housing 3, and the locking claw 31*g* may be formed in the body 103 as a holding member. Further, in the above description, the electronic component unit 1 has been described such that a pair of the locking claws 31*g* and locking recesses 41 are defined as a set, and four sets of locking structures 40 are provided, but it is not limited thereto. In the locking structure 40, the first locking structure 40A and the second locking structure 40B may not be distinguished from each other.

In the above description, the description has been given of a case where each of the curved protrusion side corner 31*n* and the recess side corner 41*b* is formed at both ends of the protrusion side locking surface 31*l* and the recess side locking surface 41*a*, it is not limited thereto. In the locking structure 40, the curved protrusion side corners 31*n* and the recess side corner 41*b* may be provided at the corner in which the collision energy between the recess side locking surface 41*a* and the protrusion side locking surface 31*l* is likely to relatively increase, depending on the clearance state between the locking recess 41 (lock arm 111) and the locking claw 31*g*, and the degree of the slope of the electronic component unit 1, the recess side locking surface 41*a* and the protrusion side locking surface 31*l*.

Further, as illustrated in an electronic component unit 201 according to the modified example of FIG. 11, when unlocking the respective locking claws 31*g* of the locking structures 40 using an unlocking jig such as a driver to extract the electronic component unit 201 from the electronic component unit housing 110 of the body 103 (see FIG. 9 or the like), a grasping recess 50 for grasping the electronic component unit 201 by a pulling jig such as longnose pliers may be provided. The grasping recess 50 is formed, for example, in a corner of the connecting portion between the rectangular frame-like section 32*a* and the ceiling 32*b* of the top cover 32. Thus, when the wall surface of the electronic component unit housing 110 is set to be high to protect the electronic component unit 201, for example, even when the electronic component unit 201 is not extracted only by the unlocking jig, the electronic component unit 201 can be appropriately raised by grasping the grasping recess 50 using the pulling jig, and it is possible to improve the removal of the electronic component unit 201.

In the locking structure, the electronic component unit and the wire harness according to the present invention, when a locking protrusion is locked to a locking recess, a housing that houses the electronic component can be locked and assembled to the holding member. Further, according to the locking structure, the electronic component unit and the wire harness, since a recess side corner of an end of a recess side locking surface of the locking recess, and a protrusion side corner of an end of a protrusion side locking surface of a locking protrusion are both formed in a curved shape, the recess side corner and the protrusion side corner can be brought into surface-contact with each other. Thus, it is possible to relax the stress concentration on the recess side corner and the protrusion side corner. As a result, the locking structure, the electronic component unit and the wire harness exhibit an effect capable of improving the durability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A locking structure comprising:
a locking recess that is formed in a recessed shape on one of a housing which houses an electronic component and a holding member to which the housing is assembled; and
a locking protrusion that is formed in a protrusion shape capable of being fitted to the locking recess on the other of the housing or the holding member, and capable of being locked to the locking recess, wherein
the locking recess has a recess side corner that is formed in a curved shape at an end of a recess side locking surface that is a locking surface with the locking protrusion, and
the locking protrusion has a protrusion side corner that is formed in a curved shape and faces the recess side corner at an end of a protrusion side locking surface that is a locking surface with the locking recess and wherein
the locking recess is defined by a locking shaft in which the recess side locking surface is formed, and a pair of arm portions which supports both ends of the locking shaft, and
the recess side corner is formed in a connecting portion between the locking shaft and the arm portion.

2. The locking structure according to claim 1, wherein a curvature of the protrusion side corner is equal to or less than a curvature of the recess side corner.

3. The locking structure according to claim 1, wherein the recess side corners are formed at both ends of the recess side locking surface, and
the protrusion side corners are formed at both ends of the protrusion side locking surface.

4. The locking structure according to claim 2, wherein the recess side corners are formed at both ends of the recess side locking surface, and
the protrusion side corners are formed at both ends of the protrusion side locking surface.

5. The locking structure according to claim 1, wherein the recess side locking surface and the protrusion side locking surface are inclined with respect to a horizontal direction in a state in which the housing is assembled to the holding member.

6. The locking structure according to claim 2, wherein the recess side locking surface and the protrusion side locking surface are inclined with respect to a horizontal direction in a state in which the housing is assembled to the holding member.

7. The locking structure according to claim 3, wherein the recess side locking surface and the protrusion side locking surface are inclined with respect to a horizontal direction in a state in which the housing is assembled to the holding member.

8. The locking structure according to claim 1 wherein,
the locking structure is configured to include a first locking structure and a second locking structure, wherein the first locking structure is a locking structure that is configured to lock the housing to the holding member in a first direction, and wherein the second locking structure is a locking structure that is configured to lock the housing to the holding member in a second direction opposite to the first direction.

9. The locking structure according to claim 8 wherein, the first direction is a direction vertically from the upper side of the locking structure, and the second direction is a direction vertically from the lower side of the locking structure.

\* \* \* \* \*